(12) United States Patent
Gryaznov

(10) Patent No.: US 8,528,089 B2
(45) Date of Patent: Sep. 3, 2013

(54) KNOWN FILES DATABASE FOR MALWARE ELIMINATION

(75) Inventor: Dmitry Gryaznov, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 1091 days.

(21) Appl. No.: 11/641,043

(22) Filed: Dec. 19, 2006

(65) Prior Publication Data
US 2008/0147612 A1    Jun. 19, 2008

(51) Int. Cl.
*G06F 17/30* (2006.01)

(52) U.S. Cl.
USPC .................................. 726/24; 713/165; 707/3

(58) Field of Classification Search
USPC .......................................... 726/24; 713/165
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 7,861,296 B2 * | 12/2010 | Costea et al. | 726/22 |
| 2003/0074574 A1 * | 4/2003 | Hursey et al. | 713/200 |
| 2004/0172551 A1 * | 9/2004 | Fielding et al. | 713/200 |
| 2005/0027686 A1 * | 2/2005 | Shipp | 707/3 |
| 2006/0101264 A1 * | 5/2006 | Costea et al. | 713/165 |
| 2006/0130141 A1 * | 6/2006 | Kramer et al. | 726/23 |
| 2006/0174344 A1 * | 8/2006 | Costea et al. | 726/24 |
| 2007/0067842 A1 * | 3/2007 | Greene et al. | 726/24 |

OTHER PUBLICATIONS

Aycock et al., Viruses 101, Feb. 2005, ACM, 1-58113-997-7/0002.*

* cited by examiner

*Primary Examiner* — Brandon Hoffman
*Assistant Examiner* — Samuel Ambaye
(74) *Attorney, Agent, or Firm* — Patent Capital Group

(57) ABSTRACT

A method, system, and computer program product for identifying files that are found during a malware scan, thus enabling them to be excluded from further analysis. A method for handling a potential malware file comprises the steps of scanning a plurality of files to identify at least one file as potential malware, querying a database to determine whether the at least one file is known, and handling the at least one file based on whether the at least one file is known.

15 Claims, 3 Drawing Sheets

KNOWN FILES DATABASE FOR MALWARE ELIMINATION

BACKGROUND OF THE INVENTION

1. Field of the Invention

The present invention relates to a method, system, and computer program product for identifying files that are found during a malware scan by using a remote database of known files, thus enabling identified files to be excluded from further analysis.

2. Description of the Related Art

As the popularity of the Internet has grown, the proliferation of computer viruses and other malware has become more common. A malware is a program or piece of code that is loaded onto a computer without the knowledge or consent of the computer operator. A computer virus is malware that replicates itself and often loads copies of itself onto other connected computers. Ways in which viruses and other malware proliferate include loading themselves into a computer along with a Web page that a user of the computer has selected, activating and loading themselves into a computer when a user opens an E-mail attachment, loading themselves into a computer by exploiting a vulnerability (e.g. a buffer overflow) in system software, etc. etc. Once the virus has been loaded onto the computer, it is activated and may proliferate further and/or damage the computer or other computers.

Along with the proliferation of computer viruses and other malware has come a proliferation of software to detect and remove such viruses and other malware. This software is generically known as anti-virus software or programs. In order to detect a virus or other malicious program, an anti-virus program typically scans files stored on disk in a computer system and/or data that is being transferred or downloaded to a computer system and compares the data being scanned with profiles that identify various kinds of malware. The anti-virus program may then take corrective action, such as notifying a user or administrator of the computer system of the virus, isolating the file or data, deleting the file or data, etc.

Quite often a user may suspect that a computer has been infected with some new malware which is not yet detected by anti-malware products. In such cases an investigation of the user's system is necessary. This process can be automated: the usual files of interest include running processes with all their modules, services, browser helper objects, downloaded program files, processes that own opened sockets, applications launched through the Run keys in the Registry, etc. There are numerous tools available that do this kind of information gathering. The problem is that on a typical system such a tool may find hundreds or thousands of files (applications, DLLs, drivers, ActiveX controls, etc.) that may require further analysis. However, the great majority of these files are included in legitimate software that has been installed on the computer. These legitimate files do not need to be further analyzed and should be excluded from further examination. However, the legitimate files that are included with legitimate software change as new versions of the software are released, updates are installed, etc.

A need arises for a technique by which files that are found during a malware scan can be identified and thus excluded from further analysis.

SUMMARY OF THE INVENTION

The present invention is a method, system, and computer program product for identifying files that are found during a malware scan, thus enabling them to be excluded from further analysis. After the potential malware files have been located on a computer, for each one of them a number of hashes is calculated and a database is queried remotely (over the Internet) with each hash set. If it is a known file, it is omitted from further analysis. This way the overwhelming majority of collected files is eliminated and the remaining handful of files can be archived and forwarded for further in-depth analysis.

A method for handling potential malware files comprises the steps of scanning a plurality of files to identify at least one file as potential malware, querying a database to determine whether the at least one file is known, and handling the at least one file based on whether the at least one file is known. The querying step may comprise the steps of generating information identifying the at least one file, and querying the database to obtain information indicating whether the at least one file is known. The step of querying the database to obtain information indicating whether the at least one file is known may comprise the steps of transmitting a query including the generated information identifying the at least one file to a remote database, and receiving from the remote database the information indicating whether the at least one file is known. The generated information identifying the at least one file may comprise at least one secure hash of the file. The at least one secure hash of the file may be generated using at least one cryptographic hash function. The at least one cryptographic hash function may comprise at least one of MD5, MD4 SHA1, SHA256, and CRC32. The step of querying the database to obtain information indicating whether the at least one file is known may comprise the step of querying a local database to obtain the information indicating whether the at least one file is known. The handling step may comprise the steps of excluding the at least one file from further analysis if the at least one file is known and performing further analysis on the at least one file if the at least one file is not known.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

The present invention is a method, system, and computer program product for identifying files that are found during a malware scan, thus enabling them to be excluded from further analysis. After the potential malware files have been located on a computer, for each one of them a number of hashes is calculated and a database is queried remotely (over the Internet) with each hash set. If it is a known file, it is omitted from further analysis. This way the overwhelming majority of collected files is eliminated and the remaining handful of files can be archived and forwarded for further in-depth analysis.

Figure 1:
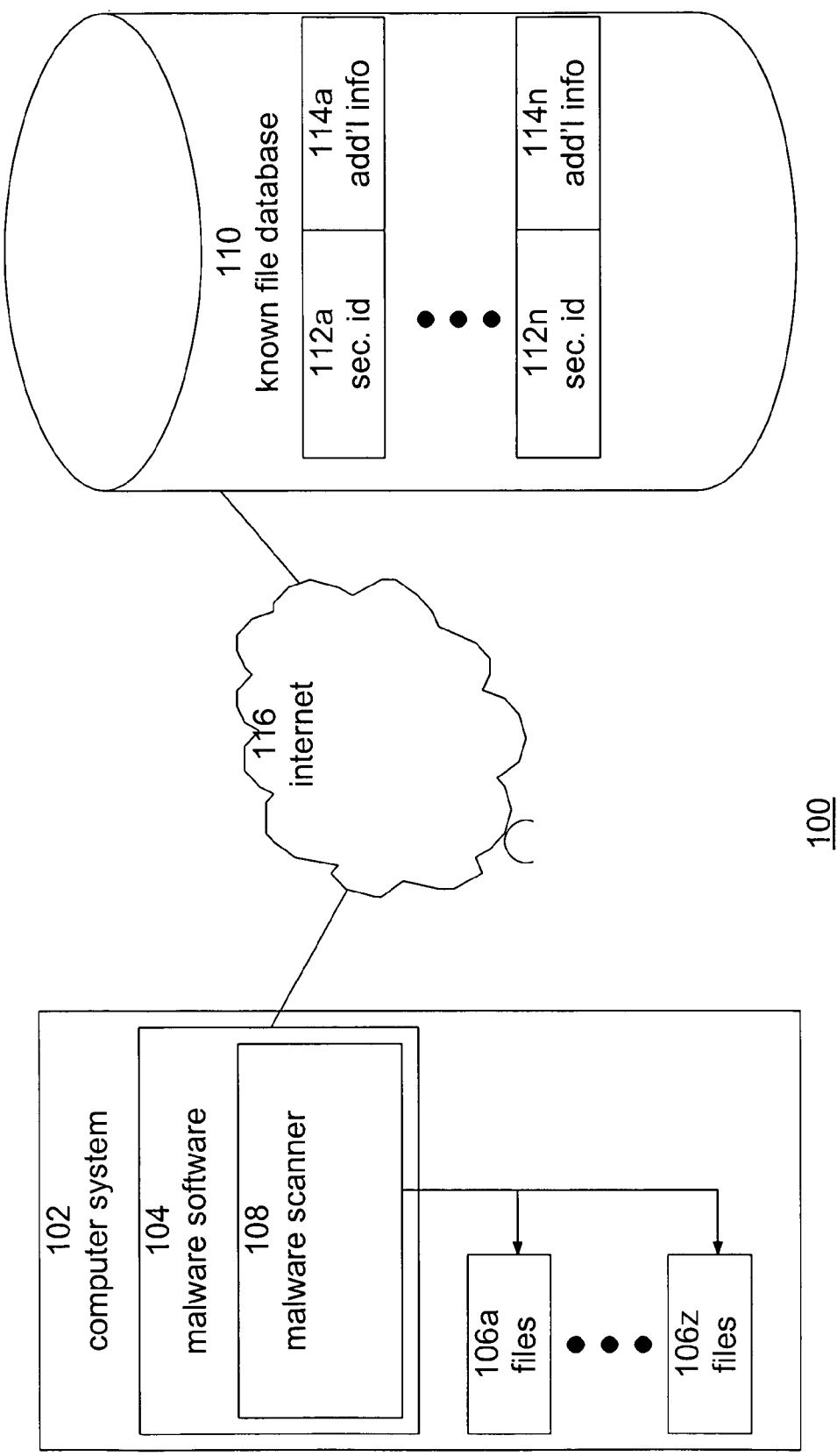
FIG. 1 is an exemplary block diagram of a system in which the present invention may be implemented.

A block diagram of a system 100 in which the present invention may be implemented is shown in FIG. 1. Computer system 102 includes malware software 104, and a plurality of files 106A-Z. Typically, malware software 104 includes malware scanner 108. Malware scanner 108 includes software that can detect and remove viruses and other malwares that may be present in computer system 102. Such software is generically known as anti-virus software or programs. In order to detect a virus or other malicious program, an anti-virus program, such as malware scanner 108, typically scans files 106A-Z such as running processes with all their modules, services, browser helper objects, downloaded program files, processes that own opened sockets, applications launched through the Run keys in the Registry, etc. Malware scanner 108 compares the files being scanned with profiles that identify various kinds of malware. Malware software 104 may then take corrective action, such as notifying a user or administrator of the computer system of the virus, isolating the file or data, deleting the file or data, etc.

For purposes of the present invention, files include any related portion of data, regardless of where or how it is stored. For example, running processes or data stored in RAM or ROM, executables, images, and other data stored on disk, etc., are all considered to be files for purposes of the present invention.

Also included in system 100 is known file database 110. Database 110 includes entries 112A-N representing known "clean" files. Each entry typically includes one or more secure identifiers of the file, such as secure identifiers 112A-N, and may optionally include additional information about the file, such as file length, etc., such as additional information 114A-N. The secure identifier is used to identify the file on the computer system 102 and to query the known file database 110, in order to determine whether the file is included in database 110, and its status as legitimate or as malware is known. The secure identifier identifies each file in a way that is difficult to forge and that has a low probability that two different files will be identified as the same file. One entity with such characteristics is the cryptographic hash function, which is a hash function with certain security properties that make it suitable for use as a primitive in various information security applications, such as authentication and message integrity. A hash function takes a string of data, such as binary data in a file, of any length as input and produces a fixed length string as output. There are a number of well-known hash functions in use, such as MD5, MD4 SHA1, SHA256, CRC32, or even the length of the file. These functions vary in security and in mis-identification or multiple-identification probability. However, the selection of the hash function, or of another type of secure identifier, is an implementation decision. The present invention contemplates any and all types of secure identifiers.

It is to be noted that the files in known file database 110 may only include files that are known to be legitimate, or the files in known file database 110 may include both files that are known to be legitimate and files that are known to be malware. In this situation, additional information may be associated with each entry in database 110 and may include information indicating whether the file is legitimate or is malware.

Computer system 102 and known file database 110 are typically communicatively connected over a network, such as the Internet 116, or another public or proprietary local area network (LAN) or wide area network (WAN).

Figure 2:
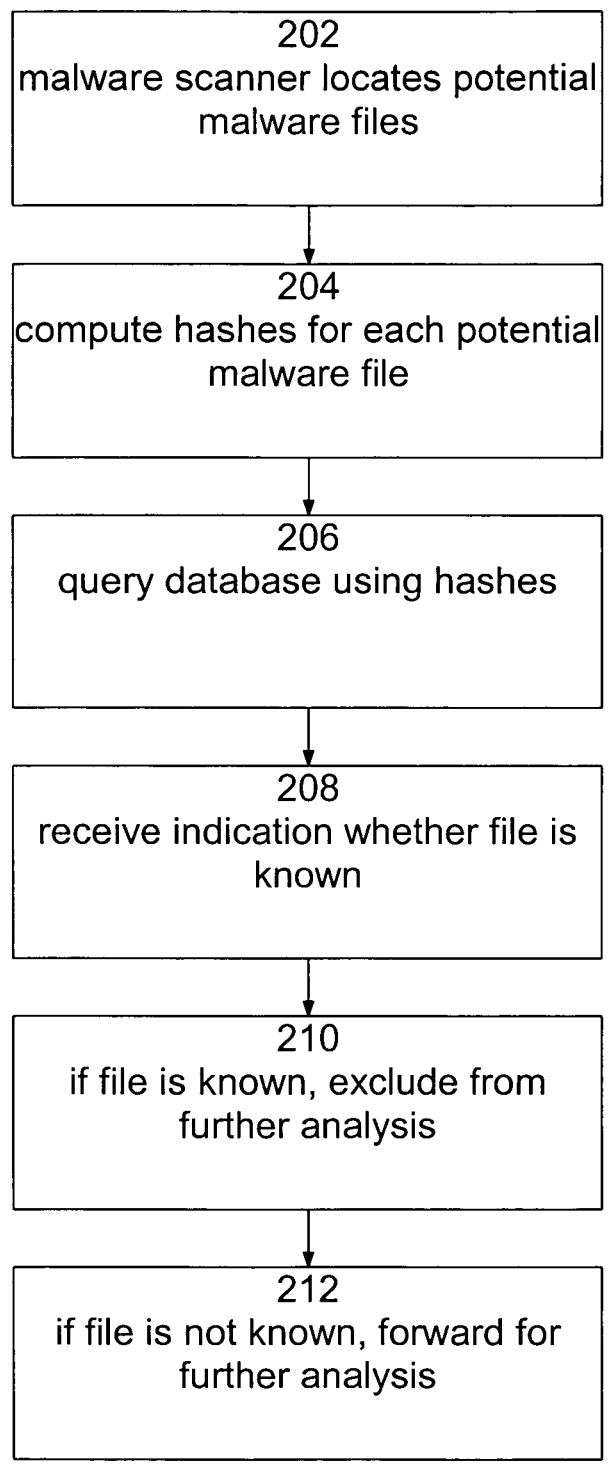
FIG. 2 is an exemplary flow diagram of a process of operation of the present invention.

An exemplary flow diagram of a process 200 of operation of the present invention is shown in FIG. 2, which is best viewed in conjunction with FIG. 1. Process 200 begins with step 202, in which malware scanner 108 scans files 106A-Z on computer system 102 and locates a number of files that may potentially be malware. In step 204, malware scanner 108 or another software module computes one or more hashes for each potential malware file. In step 206, malware scanner 108 or another software module queries known file database 110 using the computed hashes. Known file database 110 searches for the computed hashes among the security identifiers 112A-N stored in the database. If one or more of the hashes are found, then this indicates that the file for which the hash or hashes was generated is known to database 110. If none of the hashes are found in database 110, this indicates that the file for which the hash or hashes was generated is not known to database 110. Database 110 transmits an indication of whether or not the file is known, which, in step 208 is received by computer system 102. In step 210, if the file is known, then malware scanner or other software excludes the file from further analysis. In step 212, if the file is not known, then malware scanner 108 or other software may forward the file to another system for further analysis.

Figure 3:
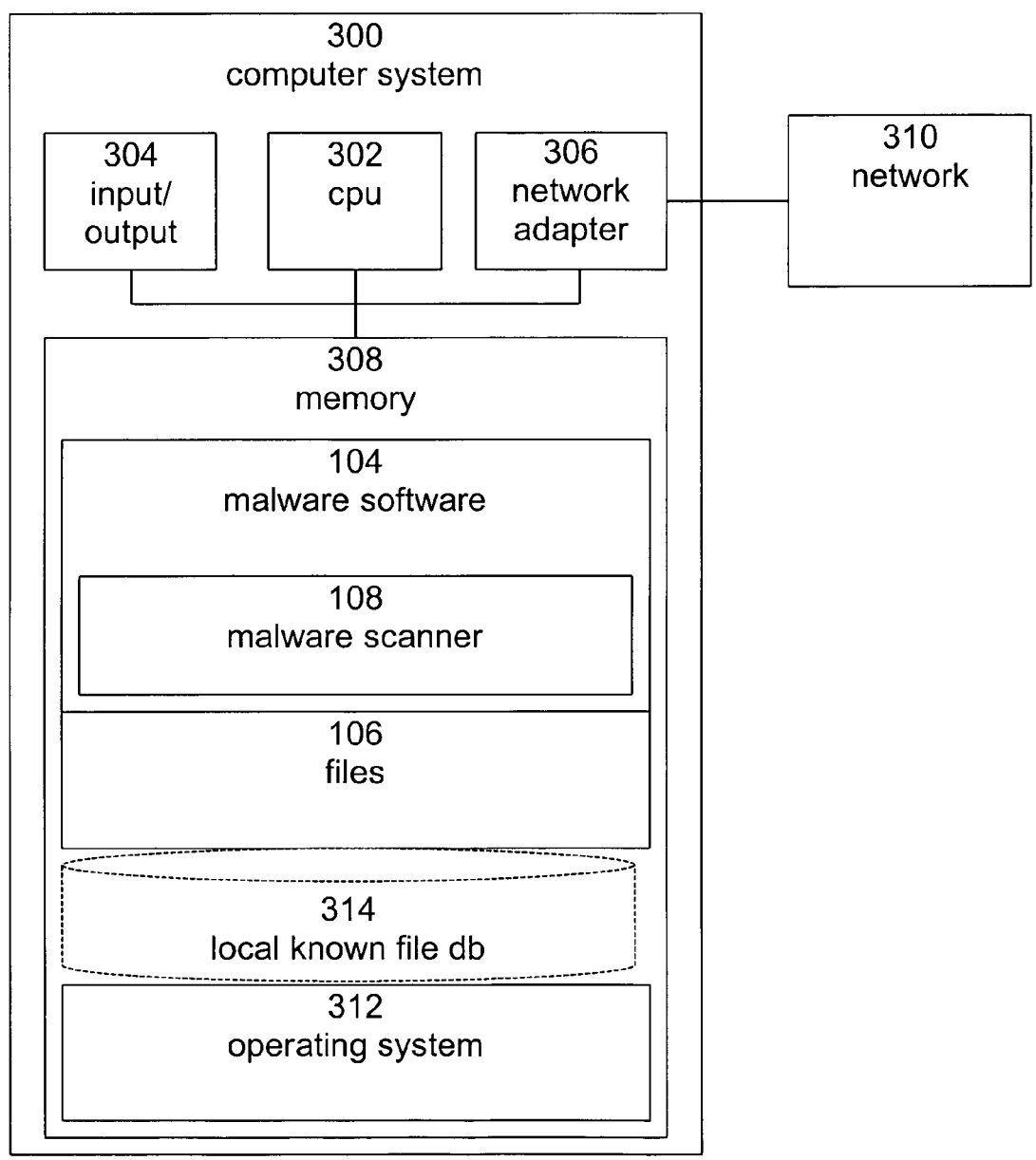
FIG. 3 is an exemplary block diagram of a system in which the present invention may be implemented.

A block diagram of an exemplary computer system 300, in which the present invention may be implemented, is shown in FIG. 3. Computer system 300 is typically a programmed general-purpose computer system, such as a personal computer, workstation, server system, and minicomputer or mainframe computer. Computer system 300 includes processor (CPU) 302, input/output circuitry 304, network adapter 306, and memory 308. CPU 302 executes program instructions in order to carry out the functions of the present invention. Typically, CPU 302 is a microprocessor, such as an INTEL PENTIUM® processor, but may also be a minicomputer or mainframe computer processor. Although in the example shown in FIG. 3, computer system 300 is a single processor computer system, the present invention contemplates implementation on a system or systems that provide multi-processor, multi-tasking, multi-process, multi-thread computing, distributed computing, and/or networked computing, as well as implementation on systems that provide only single processor, single thread computing. Likewise, the present invention also contemplates embodiments that utilize a distributed implementation, in which computer system 300 is implemented on a plurality of networked computer systems, which may be single-processor computer systems, multi-processor computer systems, or a mix thereof.

Input/output circuitry 304 provides the capability to input data to, or output data from, computer system 300. For example, input/output circuitry may include input devices, such as keyboards, mice, touchpads, trackballs, scanners, etc., output devices, such as video adapters, monitors, printers, etc., and input/output devices, such as, modems, etc. Network adapter 306 interfaces computer system 300 with network 310. Network 310 may be any standard local area network (LAN) or wide area network (WAN), such as Ethernet, Token Ring, the Internet, or a private or proprietary LAN/WAN.

Memory 308 stores program instructions that are executed by, and data that are used and processed by, CPU 302 to perform the functions of the present invention. Memory 308 may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 308 includes malware software 104, files 106, operating system 312, and may optionally include local known file database 314. Typically, malware software 104 includes malware scanner 108. Malware scanner 108 includes software that can detect and remove viruses and other malwares that may be present in computer system 102. Such software is generically known as anti-virus software or programs. In order to detect a virus or other malicious program, an anti-virus program, such as malware scanner 108, typically scans files 106A-Z such as running processes with all their modules, services, browser helper objects, downloaded program files, processes that own opened sockets, applications launched through the Run keys in the Registry, etc. Malware scanner 108 compares the files being scanned with profiles that identify various kinds of malware. Malware software 104 may then take corrective action, such as notifying a user or administrator of the computer system of the virus, isolating the file or data, deleting the file or data, etc. Operating system 312 provides overall system functionality.

In some situations, computer system 300 may not be communicatively connected to a remote known file database, such as that shown in FIG. 1. This situation may occur when a network connection is down, or, in the case of a mobile computer, when the computer system is being used without a network connection. In this situation, it may be advantageous to include the optional local known file database 314. Typically, local known file database 314 includes only a portion of the files that may be included in a remote known file database. For example, files that are unlikely to frequently change or be updated may be included in local known file database 314. Use of local known file database 314 would provide at least a portion of the functionality of the present invention even when computer system 300 is not be communicatively connected to a remote known file database. Additionally, local known file database 314 may be used even when computer system 300 is communicatively connected to a remote known file database. In this arrangement, use of local known file database 314 may reduce network traffic between computer system 300 and the remote known file database.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method, comprising:
    scanning a plurality of files to identify at least one file as potential malware;
    generating information identifying the at least one file, wherein the generated information comprises a secure hash of the at least one file that is generated using a cryptographic hash function;
    querying a database to determine whether the at least one scanned file identified as potential malware is already known to be free from potential malware or known to be representative of malware, wherein the secure hash is evaluated in order to determine its status as being legitimate or representative of malware, wherein the database includes at least one entry representing a file known to legitimate and at least one entry representing a file known to be representative of malware, wherein each entry of the database represents either a file known to be legitimate or a file known to be representative of malware, and wherein each entry further includes information indicating whether the representation of the file is legitimate or representative of malware;
    excluding the at least one file from further analysis if the at least one file is known; and
    performing further analysis on the at least one file if the at least one file is not known.

2. The method of claim 1, wherein the querying step comprises the steps of:
    querying the database to obtain information indicating whether the at least one file is known.

3. The method of claim 2, wherein the step of querying the database to obtain information indicating whether the at least one file is known comprises the steps of:
    transmitting a query including the generated information identifying the at least one file to a remote database; and
    receiving from the remote database the information indicating whether the at least one file is known.

4. The method of claim 1, wherein the at least one cryptographic hash function comprises at least one of MD5, MD4, SHA1, SHA256, and CRC32.

5. The method of claim 2, wherein the step of querying the database to obtain information indicating whether at least one file is known comprises the step of:
    querying a local database to obtain the information indicating whether the at least one file is known.

6. A system comprising:
    a processor operable to execute computer program instructions;
    a memory coupled to the processor and operable to store computer program instructions executable by the processor such that the system is configured for:
        scanning a plurality of files to identify at least one file as potential malware;
        generating information identifying the at least one file, wherein the generated information comprises a secure hash of the at least one file that is generated using a cryptographic hash function;
        querying a database to determine whether the at least one scanned file identified as potential malware is already known to be free from potential malware or known to be representative of malware, wherein the secure hash is evaluated in order to determine its status as being legitimate or representative of malware, wherein the database includes at least one entry representing a file known to legitimate and at least one entry representing a file known to be representative of malware, wherein each entry of the database represents either a file known to be legitimate or a file known to be representative of malware, and wherein each entry further includes information indicating whether the representation of the file is legitimate or representative of malware;
        excluding the at least one file from further analysis if the at least one file is known; and
        performing further analysis on the at least one file if the at least one file is not known.

7. The system of claim 6, wherein the querying step comprises the steps of:
    querying the database to obtain information indicating whether the at least one file is known.

8. The system of claim 7, wherein the step of querying the database to obtain information indicating whether the at least one file is known comprises the steps of:
- transmitting a query including the generated information identifying the at least one file to a remote database; and
- receiving from the remote database the information indicating whether the at least one file is known.

9. The system of claim 6, wherein the at least one cryptographic hash function comprises at least one of MD5, MD4, SHA1, SHA256, and CRC32.

10. The system of claim 7, wherein the step of querying the database to obtain information indicating whether the at least one file is known comprises the step of:
- querying a local database to obtain the information indicating whether the at least one file is known.

11. A computer program product comprising:
- a non-transitory computer readable storage medium;
- computer program instructions, recorded on the computer readable storage medium, executable by a processor, for performing:
  - scanning a plurality of files to identify at least one file as potential malware;
  - generating information identifying the at least one file, wherein the generated information comprises a secure hash of the at least one file that is generated using a cryptographic hash function;
  - querying a database to determine whether the at least one scanned file identified as potential malware is already known to be free from potential malware or known to be representative of malware, wherein the secure hash is evaluated in order to determine its status as being legitimate or representative of malware, wherein the database includes at least one entry representing a file known to legitimate and at least one entry representing a file known to be representative of malware, wherein each entry of the database represents either a file known to be legitimate or a file known to be representative of malware, and wherein each entry further includes information indicating whether the representation of the file is legitimate or representative of malware;
  - excluding the at least one file from further analysis if the at least one file is known; and
  - performing further analysis on the at least one file if the at least one file is not known.

12. The computer program product of claim 11, wherein the querying step comprises the steps of:
- querying the database to obtain information indicating whether the at least one file is known.

13. The computer program product of claim 12, wherein the step of querying the database to obtain information indicating whether the at least one file is known comprises the steps of:
- transmitting a query including the generated information identifying the at least one file to a remote database; and
- receiving from the remote database the information indicating whether the at least one file is known.

14. The computer program product of claim 11, wherein the at least one cryptographic hash function comprises at least one of MD5, MD4, SHA1, SHA256, and CRC32.

15. The computer program product of claim 12, wherein the step of querying the database to obtain information indicating whether the at least one file is known comprises the step of:
- querying a local database to obtain the information indicating whether the at least one file is known.

* * * * *